United States Patent [19]

Fransgaard

[11] Patent Number: 5,163,277
[45] Date of Patent: Nov. 17, 1992

[54] MACHINE FOR TEDDING, TURNING AND GATHERING OF HAY, STRAW AND SIMILAR MATERIAL

[75] Inventor: Thorkild B. Fransgaard, Farsoe, Denmark

[73] Assignee: Fransgaard Maskinfabrik A/S, Farsoe, Denmark

[21] Appl. No.: 730,885
[22] PCT Filed: Jan. 19, 1990
[86] PCT No.: PCT/DK90/00021
   § 371 Date: Sep. 20, 1991
   § 102(e) Date: Sep. 20, 1991
[87] PCT Pub. No.: WO90/07868
   PCT Pub. Date: Jul. 26, 1990

[30] Foreign Application Priority Data

Jan. 20, 1989 [DK] Denmark .................. 276/89

[51] Int. Cl.⁵ ............... A01D 78/10; A01D 80/02
[52] U.S. Cl. ..................... 56/366; 56/155; 56/367; 56/370; 56/396
[58] Field of Search ......... 56/15.5, 15.6, 15.2, 56/15.8, 16.1, 16.2, 16.3, 366, 367, 370, 372, 396

[56] References Cited

U.S. PATENT DOCUMENTS

| | | | |
|---|---|---|---|
| 3,555,800 | 1/1971 | Stoll et al. | 56/370 |
| 3,664,105 | 5/1972 | Stiefvater et al. | 56/370 |
| 3,910,019 | 10/1975 | Schlittler | 56/367 |
| 4,149,364 | 4/1979 | Aron | 56/366 |
| 4,173,110 | 11/1979 | Hansen, Jr. | 56/15.5 X |
| 4,175,369 | 11/1979 | Gerlinger | 56/370 |
| 4,179,872 | 12/1979 | Gerlinger | 56/366 |
| 4,194,348 | 3/1980 | Gerlinger | 56/377 |
| 4,245,457 | 1/1981 | Gerlinger | 56/370 |
| 4,864,809 | 9/1989 | Van Der Lely et al. | 56/370 X |

FOREIGN PATENT DOCUMENTS

| | | |
|---|---|---|
| 2529928 | 1/1977 | Fed. Rep. of Germany . |
| 3000538 | 1/1980 | Fed. Rep. of Germany . |
| 2917744 | 11/1980 | Fed. Rep. of Germany . |
| 2919241 | 11/1980 | Fed. Rep. of Germany . |
| 3619045 | 12/1987 | Fed. Rep. of Germany . |
| 474941 | 8/1969 | Switzerland . |
| 654977 | 3/1986 | Switzerland . |

*Primary Examiner*—George A. Suchfield
*Attorney, Agent, or Firm*—Finnegan, Henderson, Farabow, Garrett & Dunner

[57] ABSTRACT

A machine for spreading, turning and raking together hay, straw and similar materials. The machine has rotors (65, 84) which are rotatable around substantially vertical axles and are provided with rake arms (67) which extend radially and substantially horizontally from the rotation axles (58) of the rotors (65, 84). A number of parallel rods (68) are connected to the outermost ends of the rake arms (67) which rods constitute a rake. The rotors (65, 84) have a guide device (79, 85) so the rake arms (67) may be turned a previously determined angle around their longitudinal axis so that the rods (68) may interact with or go free of straw crops laid out in a field area. The guide devices (79, 85) are adapted to be turned around the axles (58) of the rotors (65, 84), and the guide device of one rotor (84) may be turned into the opposite direction of work so that it is possible to guide the laying down of the material into single swathes (105), double swathes (102, 104) or into a middle tract (106). The machine has a threepoint suspension and is telescopingly adjustable with regard to the working width; and the angle between the direction of travel of the machine and a line between the rotational axles (58) of the rotors (65, 84) is adjustable to obtain the exactness of the deposition of the crops.

7 Claims, 6 Drawing Sheets

MACHINE FOR TEDDING, TURNING AND GATHERING OF HAY, STRAW AND SIMILAR MATERIAL

BACKGROUND OF THE INVENTION

This invention relates to a machine for spreading, turning and raking together straw crops, such as hay, straw and similar materials.

The machine has means for cooperation with a three point suspension on an agricultural tractor, and has at least a first rotor and a second rotor which may rotate in concurrent or non-concurrent direction, which rotors are provided with a number of rake arms extending radially from the axles of the rotors, which rake arms carry along a part of their free length parallel rods which extend away from the longitudinal axis of the, rake arms and form rake teeth. The rake arms are provided at their radially inwards ends with rollers interacting with circumferential grooves in guide devices connected to each of the axles of the rotors, which grooves follows a sequence by which the rods are moved from a first position parallel to said axles to a second position in which the rods are tilted downwards and rearwards in relation to the rotational direction of the rotors during part of the rotation, and back to the said first position during the remaining part of the rotation of the rotors in such a way that the straw crops may be caught by the rods in the said first position and deposited to the side of the rotors during the said second position.

From German printed patent specification no. 3.000.538 a machine of the above mentioned kind is known. This machine is of fixed construction and therefore is applicable only for certain standard purposes where the straw crop is uniform both in regard to size and volume.

It is therefore necessary to procure several sizes and constructions of such machines so that the individual machines may be used for the tasks for which they are specially intended.

This of course requires great investments in machines which furthermore during a great part of the year may be left unused when no straw crops appear for which they are intended In the cultivation of straw crops, such as hay, straw and similar materials, machines are used for spreading and turning of the crops to facilitate the drying, whereafter the dry straw crops are raked together for the collection of the crop with suitable machines.

The machines for the collection of straw crops are preferably machines which during the collection gather the straws into a smooth layer of uniform thickness and width, which layer is then rolled into a spiral to form a round bale. The above mentioned machine is unsuitable for placing the straw crops in swathes in cases where the amount and/or the density of the straw crops in the field varies because the machine as a result of its fixed setting may only be adjusted in accordance with such variations with by a great deal of effort if the collection is to be effected later by means of a round-bale machine.

Therefore an embodiment of the machine of the above mentioned kind is needed by which only a single machine is necessary instead of several different machines, which machine, even if it may be more expensive than each of the known machines, nevertheless is cheaper than the total expense of two or more of the known machines. Furthermore a single machine does not need as much storage space as several of the known machines.

SUMMARY OF THE INVENTION

This object will be achieved by a machine of the above mentioned description which machine is characteristic according to the invention in that the machine has means which are adjustable either to permit a limited sideways movement of the machine in relation to the three point suspension of the tractor or to lock the machine both sideways as well as in the vertical direction. The machine has a first and a second power device which preferably consist of double acting hydraulic cylinders controllable from the hydraulic system of the tractor. The machine also has a telescoping main arm longitudinally adjustable by means of the second power device, which main arm at the right end as seen in the direction of travel of the machine carries the said first rotor and at the left end carries the said second rotor, and which arm may be locked in two position, of which in the first position the longitudinal direction of the arm is transverse to the direction of function of the machine, and in the second position the second rotor is placed further to the rear in relation to the first rotor. Further, the first power device can place the main arm with the rotors in such a position that the axles of the rotors are either substantially vertical or are tilted downwards and rearwards in relation to the direction of travel that the guide device placed at the first rotor may be locked at a first or a second position depending on the said first or second positions of the main arm, that the guide device placed at the second rotor may be locked in a first, a second or a third position of which the first and the second position corresponds to the first and the second position of the first guide device, and that the rollers of the second rotor are adjustable between being turned one way in the groove in relation to the direction of revolution of the rotor when the second guide device is in the first and second position, or to be turned into the opposite direction when the second guide device is in the said third position.

The machines for spreading, turning and raking together of straw crops are constructed to be suspended on a tractor of the kind indicated in the following.

In mechanized agriculture, agricultural tractors are used for traction which tractors are provided with a so called three point suspension unto which various implements, such as plows and other machines, may be connected.

The three point suspension comprises two coaxial bearing bushings or studs which are placed at a mutual distance on the lower part of the frame of the tractor with their common axis transverse to the direction of travel of the tractor. The third point of the suspension is placed at a distance above the bearing bushings or the studs, which third point is arranged to be displaced in the longitudinal direction of the tractor by suitable means which, for example, may be a hydraulic double acting cylinder. The third point may also be a bearing or a stud which has an axis parallel to the two other bearing bushings or studs.

When the tool is connected to the tractor, it is possible to displace this third point forwards or backwards from the driver's seat whereby the tool is elevated free of the ground in a position for transport or lowered to a correct working position over or down into the ground.

Besides the three point suspension, the tractor also has a power outlet in the shape of a rotatable axle by which a tool may be driven from the tractor.

In addition, pairs of hydraulic hoses are connected to the hydraulic system of the tractor to the effect that double acting, hydraulic cylinders of a work tool may be operated from the driver's seat of the tractor

BRIEF DESCRIPTION OF THE DRAWINGS

The machine according to the invention will be further explained in the following with reference to a preferred embodiment illustrated in the drawings, in which.

DETAILED DESCRIPTION OF THE INVENTION

Figure 1:
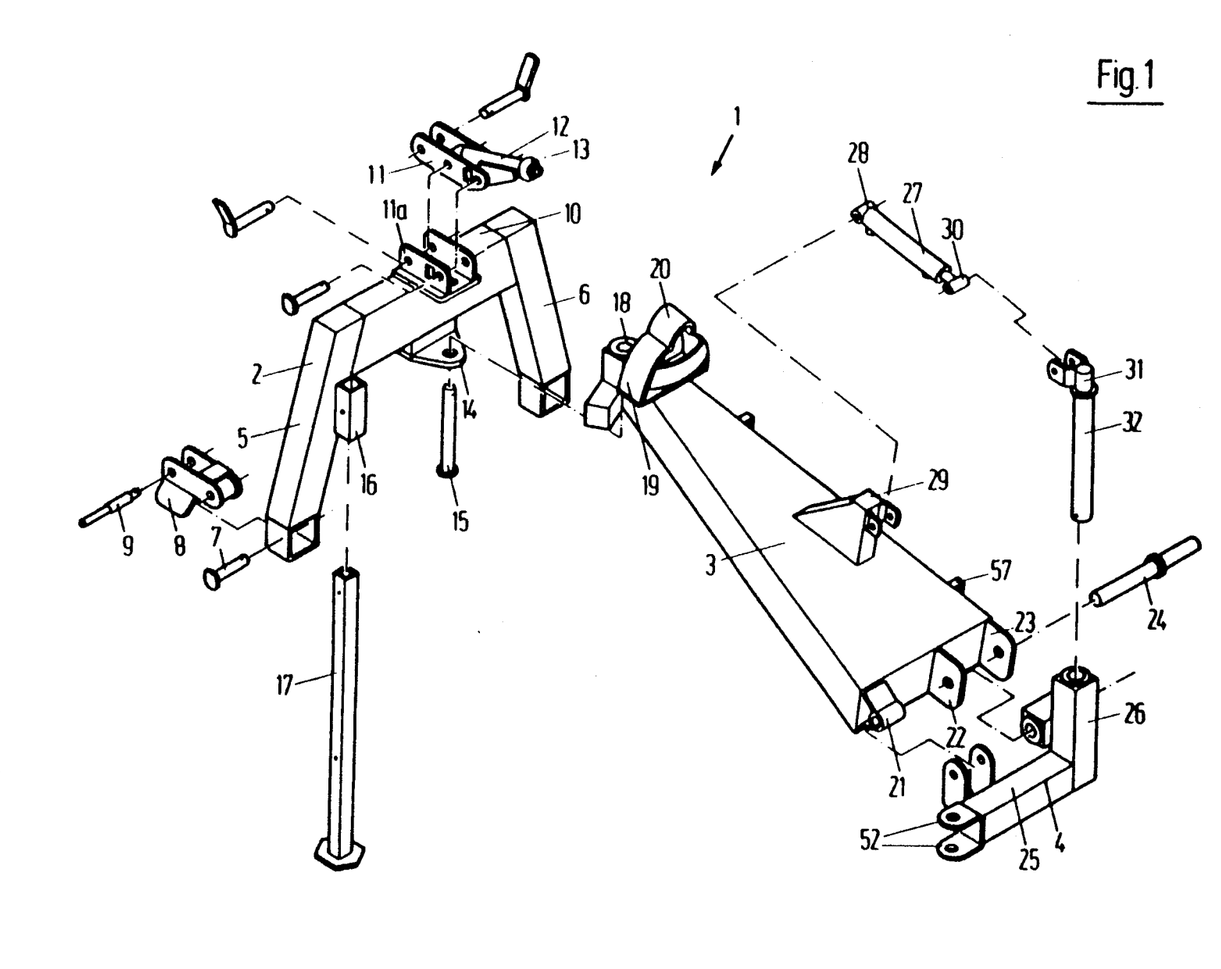
FIGS. 1-4 show the machine according to the invention in which the substantial parts are shown mutually separated.

A preferred embodiment of the machine according to the invention is shown in FIG. 1 it has a main frame 1 which comprises a yoke 2, a swing piece 3 and a connecting link 4. The yoke 2 has a horizontal part 10 and two diverging branch parts 5, 6, which are turned downwards in the machine's position of function, and at their free ends are provided with means 7, 8, 9 intended for coupling with the two lowest points of the three point suspension 101 of a tractor 100.

A fitting 11, through a guide bracket 11a is connected to the horizontal part 10 of the yoke 2, which fitting may be coupled to the third point of the three point suspension. The means 7, 8, 9 and the fitting 11 are made in such a way that it is possible by use of control means for the three point suspension hitch of the tractor to change the angle of the yoke 2 in reaction to a vertical plane transverse to the direction of travel of the tractor.

The fitting 11 furthermore has a bolt 12 which extends to the rear above the swing piece 3 which bolt at its free end is provided with a ball 13 which is rotatably connected to the bolt. The bolt 12 is mounted swivelably in a vertical plane in relation to the fitting 11 and may be locked in several positions by means of locking pins which are inserted in suitable holes in the guide bracket 11a, the fitting 11 and the bolt 12.

A bracket 14 is attached to the under side of the horizontal part 10 of the yoke 2 which bracket has a bore which together with a similar bore in the fitting 11 accommodating a main bolt 15. The yoke 2 furthermore is provided with a mounting 16 to accommodate a detachable supporting leg 17 for use when the machine is to be put aside after it has been disconnected from the three point suspension of the tractor.

The swing piece 3 has a triangular shape as seen from above and its pointed end which is turned towards the yoke 2, has a bearing bushing 18 to accommodate the main bolt 15.

When the yoke 2 and the swing piece 3 are connected together by means of the main bolt 15, the swing piece 3 may turn horizontally around the main bolt 15 in relation to the yoke 2, while the yoke 2 and the swing piece 3 are immovably connected to each other in the vertical plane.

Immediately behind the bushing 18, a control bracket 19 is provided with an internal hollow which approximately has the shape of an equilateral triangle of which one rounded corner 20 is turned upwards and whose plane is transverse to the longitudinal direction of the swing piece 3.

The mutual distance between the control bracket 19 and the bolt 12 with the rotatable ball 13 is determined in such a way that the ball 13 may be moved inside the hollow of the control bracket 19.

If the yoke 2 and the swing piece 3 are moved in relation to each other so that the ball 13 is displaced along the horizontal side of the triangular hollow or if the bolt 12 is permitted to move freely in relation to the fitting 11 then the yoke 2 and the swing piece 3 will be able to turn in relation to each other within a limited angle, but if the parts are moved in relation to each other in such a way that the ball 13 enters the rounded corner 20 or if the bolt 12 is locked in the guide bracket 11a and in the fitting 11 in a position pointing at an angle to the rear and upwards with the ball 13 squeezed into the corner 20, then the swing piece 3 will also be locked against horizontal turning in relation to the yoke 2.

The swing piece 3, at its rear end, is provided with brackets 21, 22, 23 with holes to accommodate a swing bolt 24 with an axis perpendicular to the axis of the main bolt 15.

The connecting link 4 is constructed of two short square profiled tubes 25, 26 which are stiffly interconnected at one end, and of which one tube 25 extends horizontally and the other tube 26 extends vertically. The connecting link 4 is furthermore provided with bores and/or bearings for the accommodation of the swing bolt 24 in such a way that the connecting link 4 may turn in relation to the swing piece 3.

To control the angle of the connecting link 4 a longitudinally adjustable first power device 27 is provided which, for example, consist of a double acting hydraulic cylinder and which may be controlled by means of the hydraulic system of the tractor. One end 28 of the first power device 27 is swingably connected to a bracket 29 secured to the upper side of the swing piece 3 and the other end 30 is connected to the upper end 31 of a rod 32 which is mounted in the vertical square profiled tube 26 of the connecting link 4 and extends longitudinally in relation to this tube.

Figure 2:
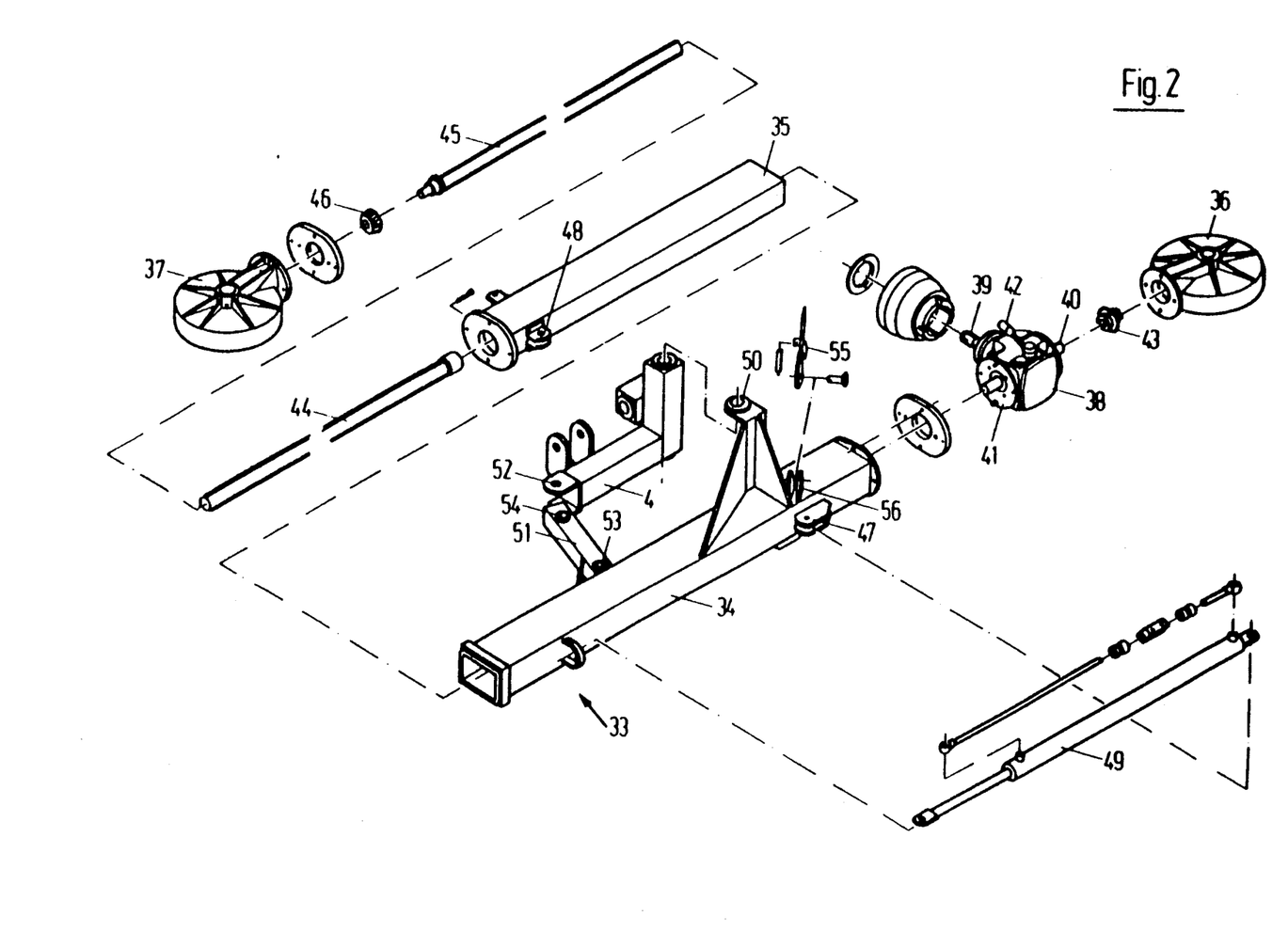

With reference to FIG. 2, rod 32 also serves as a turning bolt for a main arm 33. This main arm 33 consists of a first 34 and a second square profiled tube 35 of which the second tube 35 is mounted longitudinally displaceable inside the first tube 34.

A first 36 and a second gear housing 37 are placed at opposite ends of the main arm 33. The first gear housing 36 is placed at the right hand end of the first tube 34 as seen in the direction of travel of the machine during its function. A gear box 38 with an input axle 39, a first output axle 40 and a second output axle 41, is inserted between the first gear housing 36 and the adjoining end of the first square profiled tube 34. The input axle 39 is arranged to be driven from the power output of the tractor by means of a telescoping, longitudinally adjustable power transfer means, which is not shown in the drawings, but may be of a kind known in the art.

The gear box 38 may be adjusted into three different positions by means of a control lever 42 A first position in which none of the output axles 40, 41 are being driven, a second position in which both output axles 40, 41 are being driven in a first direction of rotation, and a third position in which the second output axle 41 is being driven in the opposite direction of rotation while the first output axle 40 continues to rotate in the first direction of rotation.

The first output axle 40 is connected to a bevel gear wheel 43 inside the first gear housing 36 and the second output axle 41 is connected to a bevel gear wheel 46 inside the second gear housing 37 through a first axle 44 and second axle 45. The second axle 45 is supported longitudinally movable inside the first axle 44, and the two axles are provided with cooperating, for example, triangular or star grooved cross sections so that the axles are locked against mutual rotation.

Two brackets are connected to the rearwards surface of the main arm 33. The first bracket 47 is placed on the first square profiled tube 34 and the second bracket 48 is placed on the second square profiled tube 35.

The two brackets 47, 48 are connected to the ends of a second power device, such as a double acting hydraulic cylinder 49 which in the same way as the above mentioned cylinder 27 may be controlled by means of the hydraulic system of the tractor.

It will be obvious from the above explanation, that driving the input axle 39 in the gear box 38 by means of the power output of the tractor depending on the position of the control lever 42 will result in, either that both bevel gear wheels 43, 46 stand still, or that they both rotate in a same direction, or that the bevel gear wheel 43 rotates in a first direction of rotation while the second bevel gear wheel 46 rotates in the opposite direction of rotation; and that it is practicable, irrespective of these three possibilities, to vary the distance between the two gear housings 36, 37 continuously between a shortest and a greatest distance, which distances are only limited by the shape of the main arm 33 and of the axles 44, 45.

The main arm 33 has furthermore a bracket 50 for connection to the above mentioned rod 32 in such a way that the main arm 33 may turn around the rod 32 in relation to the connecting link 4. The main arm 33 is furthermore provided with a rod 51 which is swingably mounted at a distance from the bracket 50 and extends substantially vertically towards the free end of the square profiled tube 25 of the connecting link 4. This free end of the square profiled tube 25 is provided with two lugs 52 with a bore to accommodate a locking pin (not shown). The locking pin may be inserted either in a first hole 53 or a second hole 54 in the rod 51.

When the locking pin is placed in the bores in the lugs 52 and is inserted through the first hole 53 in the rod 51, the longitudinal direction of the main arm 33 will be transverse to the direction of travel of the machine, and when the locking pin is inserted through the second hole 54 in the rod 51, the main arm will point at an angle rearwards with the second gear housing 37 farthest to the rear in relation to the direction of travel of the machine.

For use during transport of the machine, for example, during transport by road to a new place of work, the main arm 33 is provided with a locking latch 55 which is attached to a bracket 56. The locking latch 55 may be connected to an arm 57 connected to one side of the swing piece 3, (see FIG. 1), when the locking pin is inserted neither in the first hole 53 or in the second hole 54 in the rod 51, and the main arm 33 is turned around the rod 32 in such a way that the second gear housing 37 is moved a further distance to the rear.

Figure 3:
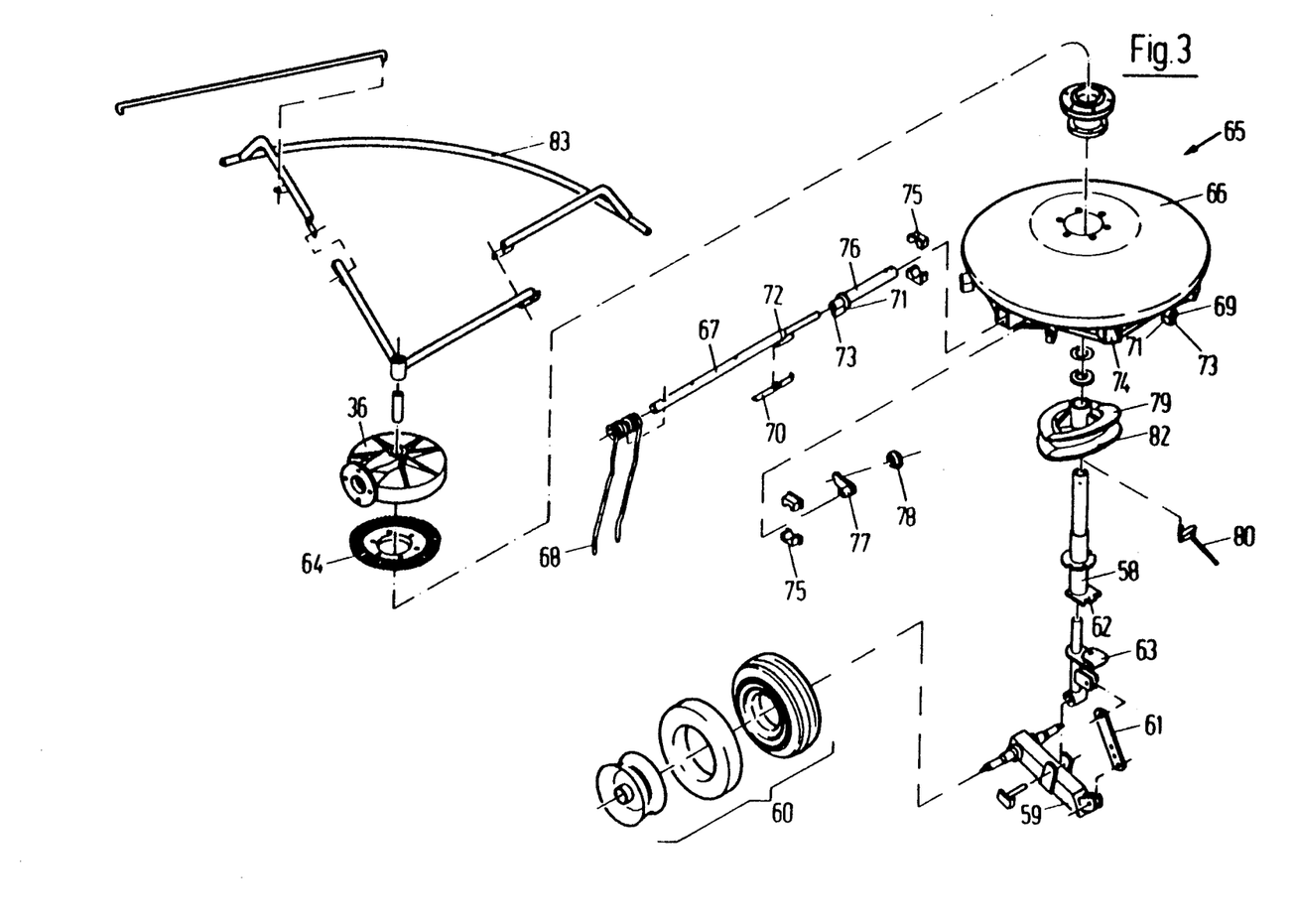

With reference to FIG. 3, an upright axle extends through the first gear housing 36, which axle at its lower end is provided with a frame 59 intended for carrying two road wheels 60 of which only one is shown in the drawings. The frame 59 may, by means of a lug 61, be adjusted at different angles in such a way that the height of the gear housing 36 above the ground may be controlled. The axle 58 is furthermore provided with a bracket 62 with two notches for a latch device 63 which may maintain the road wheels 60 in two different angular positions in relation to the gear housing 36. One position is adapted to the direction of travel of the wheels when the main arm 33 occupies a position transverse to the direction of travel of the machine, and the other position is adapted to the direction of travel of the wheels when the main arm 33 occupies a position at an angle to the direction of travel of the machine in which the second gear housing 37 is placed to the rear of the first gear housing 36. It should be noted, that there is no use for an angular position of the road wheels 60 in which the latch 55 on the main arm 33 is connected with the arm 57 on the swing piece 3, as the main arm 33 in this position is elevated so that the wheels do not touch the ground or the road surface.

In the first gear housing 36 a bevel gear wheel 64 is rotatably mounted on the axle 58, which gear wheel is in mesh with the above mentioned bevel gear wheel 43 on the first output axle 40 of the gear box 38.

A first rotor 65 is fixedly connected to the bevel gear wheel 64 and is rotatably mounted on the axle 58, which rotor comprises a rotor housing 66 provided with a number of rake arms 67 which extend radially out from the axle 58 in mutually uniform angular distances. The rotor preferably has six rake arms 67 which along a part of their outer free length are provided with a number of parallel rods 68 extending radially away from the longitudinal axes of the rake arms 67 in such a way that the rods 68 form a grate on each of the arms. The rods 68 are elastically yielding and are mounted detachably in a known manner so that they may easily be replaced in case of wear and/or damages.

During certain uses of the machine, the rake arms 67 have to be mounted immovably against longitudinal displacement in the rotor housing 66 and with the rods 68 turned downwards and parallel to the axle 58. For this purpose the rotor housing 66 is provided with a corresponding number of locking sleeves 69 in which a rake arm 67 may be locked during the rotation of the rotor 65 by means of a locking latch 70 which is spring loaded and may interact with a heel 71 on the under side of the locking sleeve 69. The rake arms 67 furthermore are provided with a cam 72 which by interacting with a notch 73 at the locking sleeve may secure the rake arms against turning around their longitudinal axis.

At other applications of the machine to rake arms 67 during the rotation of the rotor has to turn through a limited angle around their longitudinal axis, as the rods 68 during a certain part of the rotation of the rotor has to occupy a first position in which the rods are parallel to the axle 58, whereafter the rake arms 67 during a further part of the rotation have to be turned into another position in which the rods 68 are placed at an angle rearwards and downwards from the rake arms in relation to the movement of the arms during the rotation with the tips of the rods 68 at a distance from ground level, whereafter the rake arms 67 during the last part of the rotation have to be turned back to the above mentioned first position.

For this purpose a number of bearing bushings 74 are placed at equal angular distances between the locking sleeves 69 which bearing bushings 74 are provided with bearing parts 75 for the accommodation of short, first axles 76 which extends radially from the rotor housing 66 with their outer ends at the circumference of the rotor housing 66. At their radially outer ends the first axles 76 are provided with a bushing for the accommodation of the inner end of a rake arm 67, a heel 71 and a notch 73 for cooperation respectively with the locking latch 70 and with the cam 72 on the rake arm. Each first axle 76 is secured against displacement in the longitudinal direction and has at the radially inner end a short transverse arm 77 which carries a roller 78 with an axis extending radially outwards in relation to the axle 58. The rollers 78 are interacting with a first guide device 79 which is mounted turnably on the axle 58 although it by means of a latch 80 may be locked against turning in two different positions. The first position is adapted to the position of the main arm 33 transverse to the direction of travel of the machine and the second position is adapted to the position of the main arm 33 when this together with the second gear housing 37 is pointing at an angle rearwards to the left.

The first guide device 79 has a circumferential groove 82 of such a shape that the short axles 76 and thereby also the rake arms 67 are forced to be tuned around their longitudinal axles in such a way that the rods 68 are moved from their first to their second position and back again when the rollers 78 during the rotation of the rotor 65 are moved along the groove 82 in the guide device 79 which is locked against rotation.

A safety guard 83 is placed on the top of the gear housing 36 to guard the rotor 65.

Figure 4:
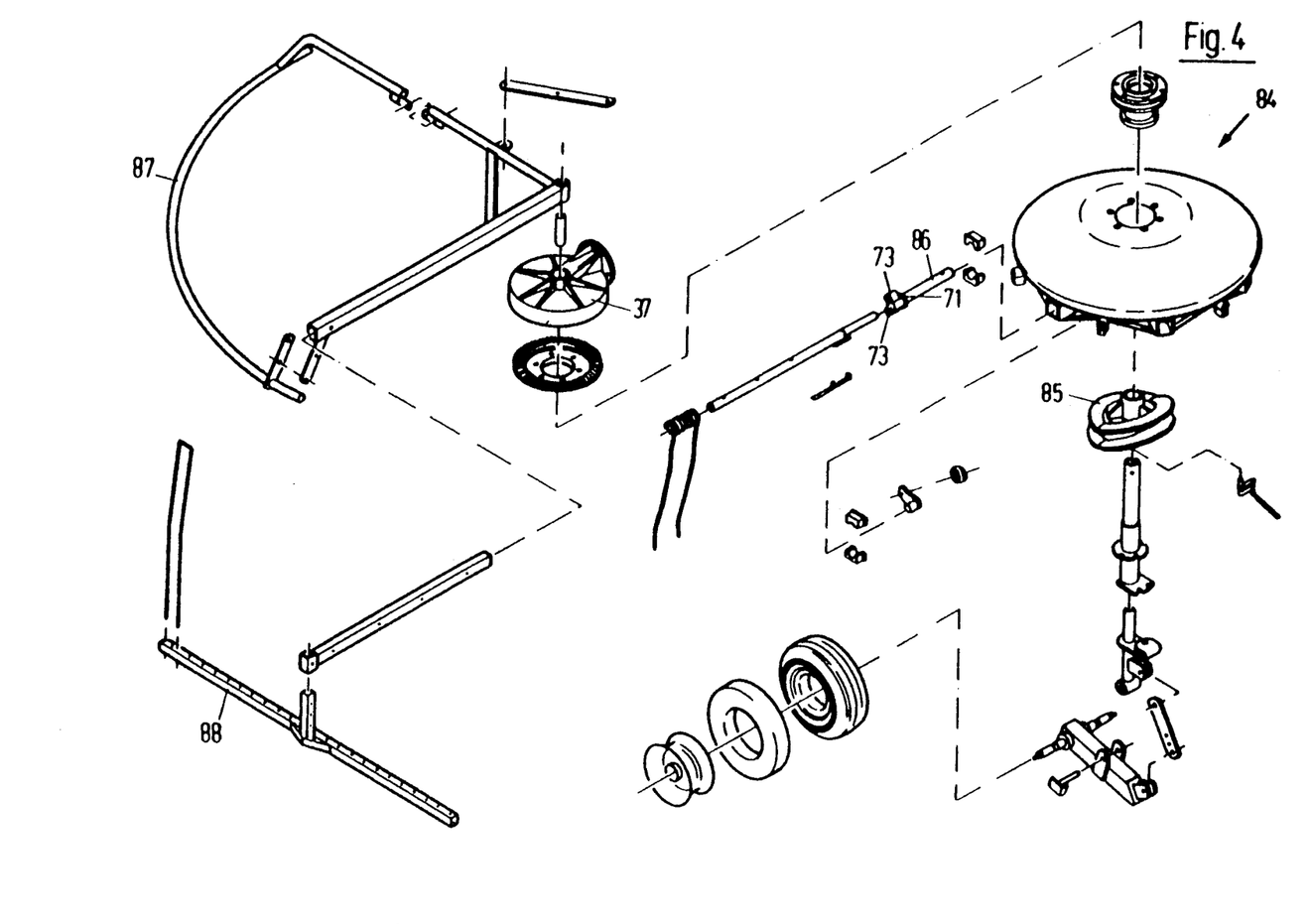

The second rotor 84 which is connected to the second gear housing 37 is depicted in FIG. 4. This second rotor 84 is arranged in the same way as the first rotor 65 except for a few parts, and in the following only the deviations from the first rotor will be described.

The second guide device 85 differs from the first guide device 79 in that the second guide device 85 may be locked against turning around the axle in three different positions, of which two correspond to the first and second position of the first guide device 79 and are used for the same functions, while the third position is intended for the use explained below.

The second rotor 84 has another set of short axles 86 which in the main correspond to the first short axles 76, but these other short axles 86 have beside the bushing for accommodating the radially inner end of the rake arms 67, a first and a second heel 71 and a corresponding first and second notch 73 to cooperate respectively with the locking latch 70 and a cam 72 on a rake arm 67, so that this may be accommodated in positions with the rods 68 extending in two different directions, which heels and notches will be apparent from FIG. 4 in comparison with FIG. 3.

The other short axles 86 are furthermore adapted to be displaced so far out of the bearing bushings 74 that he rollers 78 will be free of the groove 82 in the guide device 85 and the short axles 86 may be turned 180° around their longitudinal axis so that the transverse arms 77 with their rollers 78 are moved from, for instance, pointing rearwards from the respective short axle 86 in relation to the direction of rotation of the rotor 84, to pointing forwards in the direction of rotation.

A second safety guard 87 is furthermore attached to the top of the second gear housing 37 which safety guard 87 is provided with a grid 88 to ensure that straw crops which are collected by the second rotor 84 will be checked and made to fall to the ground at a determined distance from the machine. The grid 88 consists of a number of resilient rods which are inserted through holes in a horizontal boom. The rods are in a previously known way formed into a U-shape and the branches are each inserted through a hole in the horizontal boom. The drawing shows only one such U-shaped rod. The said boom is preferably connected to the end of a square profiled tube which may be inserted in a second square profiled tube one side of which is connected to one end of the safety guard 87.

Means are inserted in the hydraulic connections at the first and second power devices 27, 49, which means may block the flow in the connections when the power means have reached a previously determined position.

The shown preferred embodiment comprises only two rotors, but it will be understood that more rotors, for example four, may be provided in other embodiments if a larger width of work is desired.

The function and the use of the machine will be described in the following.

Figure 5:
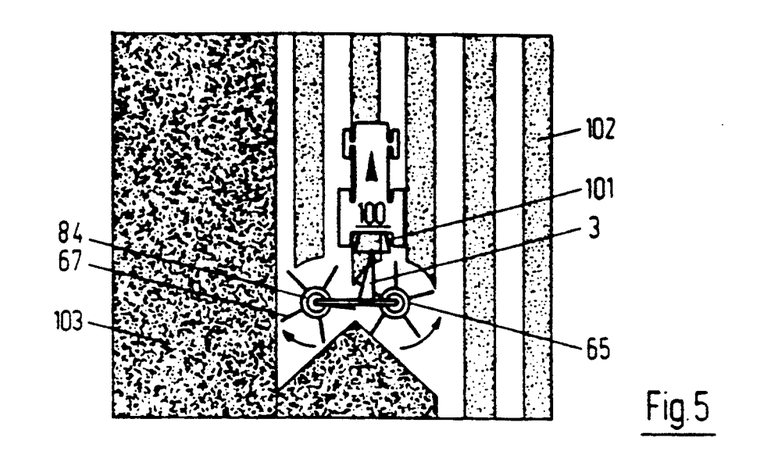
FIG. 5 shows the machine according to the invention connected to a tractor and adjusted to spreading straw crops which are laid out in swathes.

In FIG. 5, the machine is connected to the three point suspension 101 of an agricultural tractor 100 and is used for the spreading of straw crops which are laid out in single swatches 102 upon a field area.

For this purpose the locking pin is inserted through the lugs 52 of the connecting link 4 and through the first hole 51 in the rod 53 so that the longitudinal direction of the main arm 33 is transverse to the direction of travel of the machine, and the control lever 42 of the gear box 38 is placed in the said third position so that the two rotors 65, 84 will rotate in opposite directions, which means that the first rotor 65 is moving anti-clockwise and the second rotor is moving clockwise as seen from above.

The bolt 12 with the ball 13 is furthermore freely movable inside the hollow of the control bracket 19 and the first power device 27 is contracted so that the connecting link 4 and the main arm 33 are displaced in such a way that the axles 58 of the rotors 65, 84 are placed at an angle downwards to the rear in the direction of travel, whereby the tips of the rods 68 on the rake arms 67 which are pointing forward will be quite close to the ground while the corresponding tips on the rake arms 67 which are pointing to the rear will be at greater height above the ground. The road wheels 60 will bear on the ground.

The latch mechanism 63 of the wheels 60 will be displaced on the bracket 62 so that the direction of rotation of the wheels corresponds to the direction of travel of the machine when the main arm 33 is transverse to the machine.

The rake arms 67 are furthermore inserted in the locking sleeves 69 and secured against being pulled out by the cooperation between the locking latches 70 and the heels 71, and secured against turning around their longitudinal axis by means of the cams 72 which interact with the notches 73.

The second power device 49 is acted upon to pull the second square profiled tube 35 as far as possible into the first tube 34, as the constructions of the square profiled tubes 34, 35 permit and the second power means are such that the rake arms 67 of the two rotors 65, 84 will just go clear of each other during the rotation of the rotors 65, 84, whereby it is effectively prevented that the rake arms 67 bash against each other if one or more parts of the machine should be mounted in a wrong way.

The grid 88 is dismounted so that it cannot limit the ejection of straw crops to the side. As the grid is supported by a square profiled tube, this dismounting may be effected by removing the grid, turning it half a turn and inserting it again with the rods of the grid pointing upwards.

In this adjustment of the machine the straw crops will be spread as indicated by reference 103 so that the straw crops may dry.

When the spread straw crops 103 have become sufficiently dry they have to be distributed in single swathes 102 so that they may be collected later.

This collection is preferably effected by a machine which forms the collected straw crops into round bales.

Figure 6:
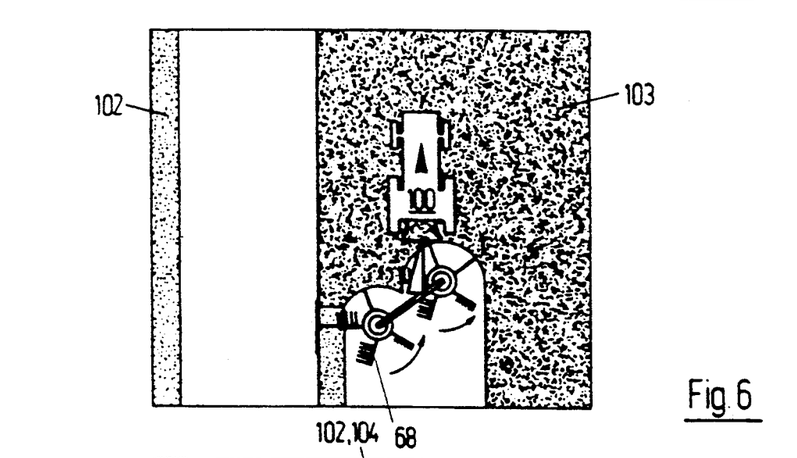
FIG. 6 shows the machine according to FIG. 1, but adapted to raking in scattered straw crops in such a way that the crops are collected in single swathes at the side.

With reference to FIG. 6, for this purpose the locking pin will be inserted through the lugs 52 of the connecting link 4 and through the second hole 54 in the rod 51 so that the main arm 33 assumes a position in which the second rotor 84 is placed at an angle to the rear and to the left of the first rotor 65.

The control handle 42 of the gear box 38 stays in the above mentioned second position so that the rotors both rotate anticlockwise, and the bolt 12 with the ball 13 stays freely movable inside the hollow of the control bracket 19.

The first power device 27 is made to extend so that the connecting link 4 and the main arm 33 will be lowered until the axles 58 are placed substantially vertical and the latch mechanism 63 of the wheels 60 is moved on the bracket 62 so that the wheels are turned to a position which corresponds to the direction of travel of the machine when the main arm 33 is pointing at an angle to the rear and to the left.

The second power device 49 is acted upon to change the length of main arm 33 so that the outermost ends of the rake arms 67 of the two rotors 65, 84 are placed at a distance of, for example, 20 cm instead of just being placed tangential to each other during the rotation. Then the machine will achieve the greatest possible working witch without leaving any straw crops in the space between the two rotors. This distance may possibly be adjusted currently during the operation of the machine.

The rake arms 67 are removed from the locking sleeves 69 on the first rotor 65 and inserted in the free ends of the first short axles 76 in such a way that the short transverse arms 77 with the rollers 78 are pointing to the rear in relation to the direction of rotation of the rotor 65, and the rollers 78 are interacting with the groove in the guide device 79. This guide device 79 is moved into and locked in the above mentioned second position which corresponds to the position of the main arm 33 pointing at an angle to the rear.

In a similar way the rake arms 67 and the other short axles 86 together with their transverse arms and rollers are mounted in the second rotor 84 and interacting with the groove 82 in the second guide device 85 which in the same way is moved into and locked in the second position.

Finally the grid 88 is mounted to prevent the straw crops raked together to be thrown arbitrarily far to the left during the function of the machine.

During the raking together, the rods 68 will as a result of the guiding of the rollers 78 in the grooves 82 of the guide device be moved in such a way that the first rotor 65 collects the straw crops in front of and under this rotor and delivers it in a row in front of the second rotor 84 which in a similar way collects the straw crops in front of and under this rotor and carries it further together with the straw crops deposited by the first rotor 65 to place all of it in a row to the left of the machine in single swathes 102 of which the left edge is limited by the grid 88 and the right edge is limited by the radially outermost rods 68 on the second rotor 84.

Figure 7:
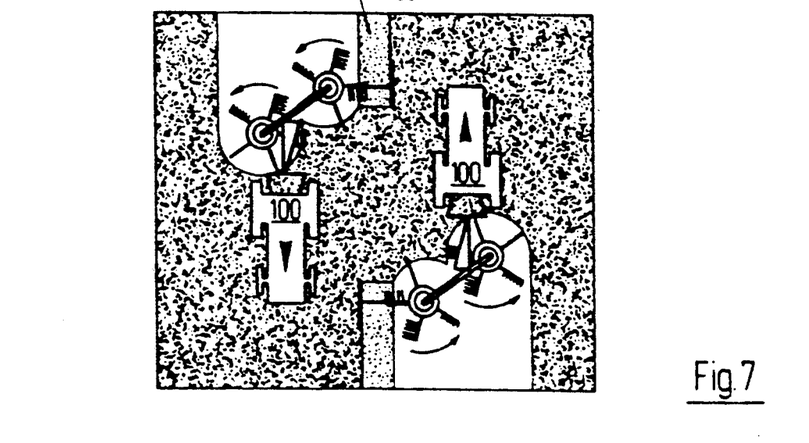
FIG. 7 shows the machine according to FIG. 1 but employed for collecting in double swathes which machine is adjusted as shown in FIG. 2, but is driven alternately in opposite directions.

With reference to FIG. 7, if it is desired that the machine also be used for producing a so called double swath 104, then the machine can be driven in two opposite directions in the field, with the mutual distance between the two directions of travel adapted in such a way that a single swath 102 from the last trip is deposited on top of the single swath 102 from the previous trip.

Figure 8:
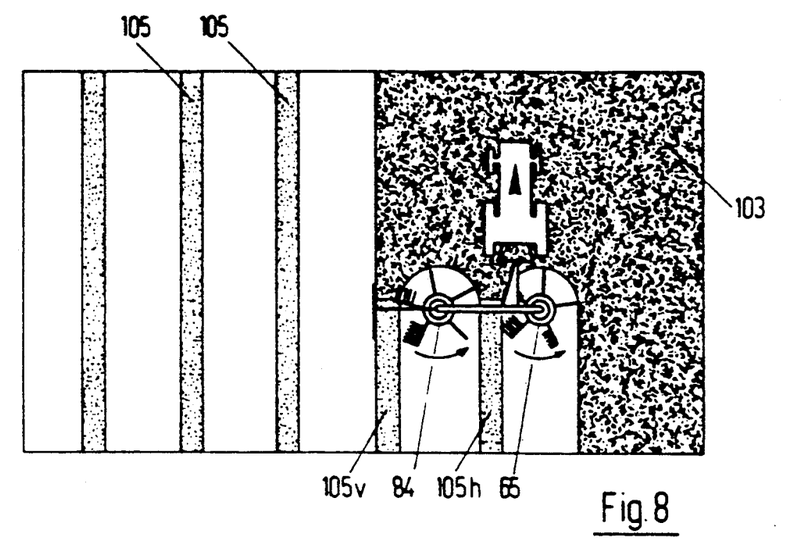
FIG. 8 shows the machine according to FIG. 1, but adapted to collection into two swathes.

With reference to FIG. 8, instead of collecting the straw crops as single swathes 102 or double swathes 104, the machine may also be adjusted to rake the crops together as two parallel single swathes 105 which have a greater mutual distance than the single swathes 102.

For this purpose the locking pin is inserted through the lugs 52 on the connecting link 4 and through the first hole 53 in the rod 51 so that the longitudinal direction of the main arm 33 is transverse to the direction of travel of the machine, and the control lever 42 of the gear box 38 is moved to the above mentioned second position so that the two rotors 65, 84 both rotate in the same direction, which means that they rotate anticlockwise as seen along the axles of the rotors from above.

The bolt 12 with the ball 13 remains freely movable from side to side inside the hollow of the control bracket 19.

The first power device 27 is induced to move the connecting link 4 and the main arm 33 to the position in which the axles 58 are substantially vertical, and the latch mechanism 63 of the wheels 60 is moved on the bracket 62 s that the wheels are turned to a position corresponding to the direction of travel of the machine when the main arm 33 is transverse to the longitudinal direction of the machine and the tractor 100.

The second power device 49 is induced to achieve the greatest possible elongation of the main arm 33 so that the rotors 65, are placed at the greatest distance from each other.

The rake arms 67 are inserted in the short axles 76, 86 in the rotors 65 and 84, both the first 79 and the second guide device 85 is locked against turning in their first position by means of the locking latches 80, and it is ensured that the short transverse arms 77 with their rollers 78 are turned in the same direction in relation to the direction of rotation of the rotors 65, 84.

In this setting of the machine both rotors 65, 84 will collect the straw crops which are placed under and in front of them in the direction of travel and deliver them in a row or a single swath 105h, 105v to the left of the rotor in question.

The single swath 105h which is laid down by the first rotor 65 will in width correspond to the distance between the radially outermost ends of the rake arms 67 of the two rotors 65, 84, and the single swath 105v which is laid down by the second rotor 84 will have a width which corresponds to the distance between the grid 88 and the radially outermost ends of the rake arms 67 on the second rotor 84.

Figure 9:
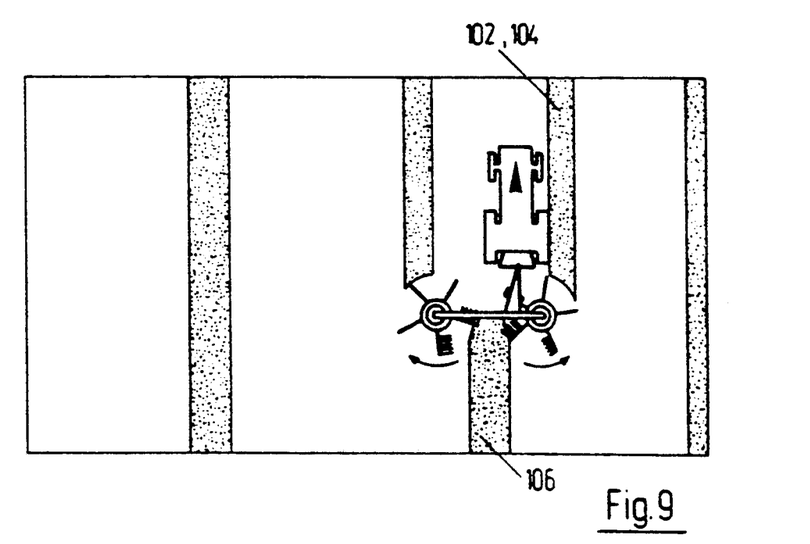
FIG. 9 shows the same machine adapted to collecting into a middle swath.

With reference to FIG. 9, it is preferable to change the single swathes 102 104 105 to a double swath 106, especially when the straw crops have to be gathered by a machine which makes the crops into round bales.

For this purpose the locking pin is inserted through the lugs 52 of the connecting link 4 and through the first hole 53 in the rod 51 so that the longitudinal direction of the main arm 33 is transverse to the direction of travel of the machine.

The control lever 42 of the gear box 38 is changed to the above mentioned third position so that the rotors 65, 84 will rotate in opposite directions, i.e. that the first rotor 65 rotates anticlockwise and the second rotor 84 rotates clockwise as seen from above in the direction of the axles of the rotors.

The bolt 12 with the ball 13 remains freely movable inside the hollow of the control bracket 19.

The first power device 27 is induced to move to the position in which the axles 58 are substantially vertical and the latch mechanism 63 of the wheels 60 is displaced on the bracket 62 in such a way that the wheels are turned to a driving position which corresponds to the direction of travel of the machine when the main arm 33 is transverse to this direction.

The second power device 49 is induced to lengthening the main arm 33 to ascertain a desired distance between the radially outermost ends of the rake arms 67 of the two rotors 65, 84.

This desired distance is determined by the operator from an estimate of the amount of straw crops which is to be collected in the double swath 106, which amount depends on the number of straws per unit of area and the type of machine which is available afterwards for the collection of straw crops and for the compression of the straw crops into bales, whether the bales will be square or round bales.

The first guide device 79 is locked in the first position with the latch 80 and the rake arms are inserted in the first short axles 76 in the first rotor 65.

The guide device of the second rotor 84 is turned to its above mentioned third position and locked against turning by means of the latch 80. The other short axles 86 are removed from the bearing bushings 74 and again inserted with the short transverse arms 77 and the rollers 78 turned app. 180° in relation to the corresponding transverse arms 77 and rollers 78 on the first rotor 65. The rake arms 67 are thereafter inserted in the bearing bushings 74 and locked against being extracted by means of the locking latches 70 which now have to interact with the second heel 71 on the other short axles 86, and locked against turning by the cams 72 interacting with the notches 73.

During the function of the machine the rotors 65, 84 will rotate in opposite directions and the rake arms 67 will move alternately between their first and their second positions during the rotation of the rotors 65, 84 in such a way that straw crops which are lying under and in front of a rotor will be collected and guided towards the opposite rotor whereby the straw crops from the two rotors will be laid down in the double swath 106 with a width which is determined by the distance between the radially outermost ends of the rake arms 67.

In the description given above is has been indicated that the bolt 12 with the ball 13 is not locked in the fitting 11 so that the bolt 12 has been able to move freely inside the hollow of the control bracket 19 which is the preferred position of the bolt 12 when the ground is even and without hillsides etc., so that it will be possible to tow the machine across the field area within the limits specified by control bracket 19. Such plain field areas may be found, for example, in New Zealand in Western Jutland or in the U.S.A.

If on the other hand the ground is strongly hilly or undulating, such as is found in Eastern Jutland, England and Ireland, it is necessary to lock the machine in relation to the three point suspension 101 of the tractor 100 to safeguard the correct functioning of the machine so that it will not slide sideways when the tractor 100 with the machine is driven along a hillside.

If such ground conditions occur, the bolt 12 with the ball 13 is locked in a position pointing upwards and rearwards by means of the locking pin which is inserted through holes in the guide bracket 11a, the fitting 11 and the bolt 12 in such a way that the ball 13 remains in the upwards rounded corner of the hollow in the control bracket 19 whereby the machine is safely locked against swerving in the sidewards directions.

This last mentioned position of the bolt 12 with the ball 13 in the control bracket 19 offers the additional advantage that in a transport position from one workplace to the next, in which the main arm 33 is turned with the second rotor 84 tilted left rearwards and is locked by the engagement of the locking device 55 around the arm on the swing piece 3, and in which the wheels 60 are raised from the road, efficient control of the machine in the sideways direction is secured as well.

The machine according to the invention offers another advantage in comparison to the other machines of the kind mentioned in the introduction which advantage is especially manifested in places where the quality of the field varies strongly within a certain area. In such places the straw crops may vary strongly in amount and distribution so that the known machines will collect a varying amount of crops per driven meter if a collecting machine such as a machine for round bales is used. A machine for round bales must preferably collect a uniform amount of straw crops to produce a round bale of uniform structure.

With the machine according to the invention this may be achieved, as it is possible during the function of the machine to lengthen or shorten the main arm 33 from the driving cabin of the tractor by means of the second power device 49, so as to regulate the width of the swathes, whether these are single swathes 102, 104, 105 or double swathes 106.

On lean areas the distance between the rotors 65, 84 will be lengthened and on more productive areas the distance is shortened so that the amount of straw crops is adapted to the capacity of the collecting machine.

An embodiment of the machine may have the following characteristics:

| | |
|---|---|
| Working width | 4.40–6.00 |
| Transport width | 2.40 m |
| Working speed | 12–15 km/h |
| Capacity | 4–8 ha/h |
| Power requirement | 30 hp/22 kW |
| Number of spreading teeth | 30 |
| Tyre dimensions | 15 × 6.00 |
| Weight | 590 kg |

| -continued | |
|---|---|
| Power outlet | 540 rev/min |

I claim:

1. A machine for spreading, turning and raking together straw crops, such as hay, straw and similar materials, comprising means for cooperatively connecting the machine to a three point suspension hitch on an agricultural tractor, at least a first rotor and a second rotor each having an axle of rotation which may rotate in concurrent or non-concurrent direction, which rotors are provided with a number of rake arms extending radially from the axles of the rotors, which rake arms along a part of their free length carry parallel rods that extend away from the longitudinal axis of the rake arms and form rake teeth, and which rake arms at their radially inwards ends are provided with rollers interacting with circumferential grooves in first and second guide devices connected to the axles of said first and second rotors respectively, which grooves follow a sequence by which the rods are moved from a first position parallel to said axles to a second position in which the rods are tilted downwards an rearwards in relation to the rotational direction of the rotors during part of the rotation, and back to the said first position during the remaining part of the rotation of the rotors whereby the straw crops may be caught by the rods in said first position and deposited to the side of the rotors during said second position, adjustable means that permit either limited sideways movement of the machine in relation to the three point suspension hitch of the tractor or to lock the machine against sideways movement as well as in the vertical direction, a first power device and a second power device controllable from the tractor, a telescoping main arm which carries at the right end thereof as seen in the direction of travel of the tractor and machine said first rotor and at the left end thereof said second rotor, which arm is lockable in two positions of which in the first position the longitudinal direction of the arm is transverse to the machine's direction of travel, and in the second position is at an angle thereto, such that the second rotor is placed further to the rear in relation to the first rotor, said second power device being adapted to longitudinally adjust the length of said telescoping main arm to vary the distance between said rotors and said first power device being adapted to pivotally adjust the main arm that carries said rotors on either end relative to the machine so that the axles of the rotors are either substantially vertical or are tiled downwards and rearwards in relation to the direction of said travel, and wherein said first guide device of the first rotor is lockable at a first or a second position depending on said first or second position of the main arm and said second guide device of the second rotor is lockable in a first, a second or a third position, in which the first and the second positions of the second guide device correspond to the first and second positions of the first guide device, the rollers of the rake arms of the second rotor being adjustable between one position where they are turned one way in the groove in relation to the direction of rotation of the second rotor when the second guide device is in said first or second positions, and a second position whereby they are turned in the opposite way when the second guide device is in said third position.

2. The machine of claim 1, wherein said main arm of the machine is connected to the three point suspension hitch of the tractor having two lower and one upper point by a main frame, which main frame comprises a yoke, a swing piece and a connecting link, said yoke having means cooperatively connecting it to the two lower points and a guide bracket with fittings cooperatively connecting it to the upper point of said three point suspension hitch; said swing piece at one end being hingedly connected to the yoke about a vertical axis and at the opposite end hingedly connected to said connecting link about a horizontal axis; said main arm being swingably connected to the connecting link about a vertical rod, said machine also comprising a substantially horizontal arm pivotally connected at one end to said main arm and having a first hole and a second hole, which holes may be alternatively connected the connecting link to thereby lock said main arm in either of said two positions, said first power device being connected at one end to said vertical rod and at the other end to said swing piece in such a way that the position of the rod can be adjusted in a substantially vertical place to thereby adjust the vertical orientation of the rotor's axes.

3. The machine of claim 1, wherein the adjustable means for limiting sideways movement of the machine in relation to the three point suspension hitch of the tractor, comprises a guide bracket attached to the yoke, a fitting which may be locked in the guide bracket which fitting swingingly accommodates a bolt that extends out over the swing piece and has its free end, a rotatably mounted ball which fits into a control bracket attached to the swing piece, said control bracket being located transverse to the direction of travel of the machine and having an inner hollow of triangular shape with a rounded upturned corner that cooperates with said ball, the bolt being lockable in the guide bracket with the fitting with the ball coating with said corner of the triangle, or being freely movable in a vertical place, with the movements of the bolt and the ball being limited by the contour of said hollow in the control bracket.

4. The machine of claim 1, wherein the main arm comprises a first square profiled tube and a second square profiled tube telescopingly accommodated inside the first tube, a first gear housing connected to the free end of said first tube and a second gear housing to the free end of the second tube, a gear box located between said first tube and said first gear housing, said gear box having an input axle and first and second output axles; the first output axle being directly connected to the first gear housing and the second output axle through a longitudinally adjustable axle to the second gear housing.

5. The machine of claim 4, wherein the input axle of the gear box is adapted to be driven from a power outlet of the tractor, the gear box adjustable being between three positions, a first position in which neither the first nor the second output axle is driven, a second position in which both output axles are driven in a first direction of rotation, and a third position in which the first output axle is driven in one direction of rotation which the second output axle is driven in the opposite direction of rotation.

6. The machine of claim 1, wherein said first and second rotors have a plurality of locking sleeves for accommodating the rake arms, which sleeve have a heel and a notch; the rake arms having a locking latch and a cam wherein the locking latches and the cams are adapted to interact with the heels and the notches in such a way that may detachably hold the rake arms against extraction from the locking sleeves or from turning in relation to these sleeves.

7. The machine of claim 6, wherein said first and second rotors have bearing bushings in which short axles and turnably mounted, which axles at the end turned away from the axles of the rotors have at least one of said heels and one of said notches and at their opposite ends have a short transverse arm which rotatably carries one of the said rollers of the rake arms in such a way that the axles of the rollers point radially away from the axles and the guide devices, the short axles on the second rotor after displacement in their longitudinal direction being turnable in such a way that the transverse arms with the rollers may be turned from pointing rearwards from the respective short axle in relation to the direction of rotation of the rotor to pointing forwards in the direction of rotation; the short axles having two heels and two notches which two extend radially in relation to the longitudinal direction of the short axles in such a way that the rake arms may be mounted detachably in the short axles of the second rotor with the rods pointing in two different directions.

* * * * *

UNITED STATES PATENT AND TRADEMARK OFFICE
CERTIFICATE OF CORRECTION

PATENT NO. : 5,163,277

DATED : November 17, 1992

INVENTOR(S) : Thorkild B. Fransgaard

Page 1 of 2

It is certified that error appears in the above-identified patent and that said Letters Patent is hereby corrected as shown below:

Claim 1, column 13, line 19 "circumferentiaI" should read --circumferential--;

line 24, "an" should read --and--;

line 51, "tiled" should read --tilted--.

Claim 2, column 14, line 21, "place" should read --plane--.

Claim 3, column 14, line 36, "coating" should read --coacting--.

Claim 5, column 14, line 60, "which" should read --while--.

Claim 6, column 14, line 65, "sleeve" should read --sleeves--.

UNITED STATES PATENT AND TRADEMARK OFFICE
CERTIFICATE OF CORRECTION

PATENT NO. : 5,163,277
DATED : November 17, 1992
INVENTOR(S) : Thorkild B. Fransgaard It is certified that error appears in the above-indentified patent and that said Letters Patent is hereby corrected as shown below:

Claim 7, column 15, line 6, "end" should read --ends--.

Signed and Sealed this

Thirtieth Day of November, 1993

BRUCE LEHMAN

Attest:

Attesting Officer

Commissioner of Patents and Trademarks